United States Patent
Chen et al.

(10) Patent No.: US 7,151,798 B2
(45) Date of Patent: Dec. 19, 2006

(54) METHOD FOR MOTION ESTIMATION USING A LOW-BIT EDGE IMAGE

(75) Inventors: Hongyi Chen, Beijing (CN); Xiaohai Qiu, Shanghai (CN)

(73) Assignee: Winbond Electronics Corp., Hsinchu (TW)

( * ) Notice: Subject to any disclaimer, the term of this patent is extended or adjusted under 35 U.S.C. 154(b) by 688 days.

(21) Appl. No.: 10/283,863

(22) Filed: Oct. 29, 2002

(65) Prior Publication Data

US 2004/0081240 A1   Apr. 29, 2004

(51) Int. Cl.
*H04B 1/66* (2006.01)
*G06K 9/40* (2006.01)

(52) U.S. Cl. .................. 375/240.16; 382/268
(58) Field of Classification Search .............
375/240.16–240.18, 240.29, 240.21, 240.22;
382/152, 190, 268; 348/606
See application file for complete search history.

(56) References Cited

U.S. PATENT DOCUMENTS

| | | | |
|---|---|---|---|
| 5,512,956 A * | 4/1996 | Yan ............................ | 348/606 |
| 6,370,279 B1 * | 4/2002 | Paik ........................... | 382/268 |
| 6,961,466 B1 * | 11/2005 | Imagawa et al. ........... | 382/190 |
| 2003/0142750 A1* | 7/2003 | Oguz et al. ............ | 375/240.18 |
| 2004/0066964 A1* | 4/2004 | Neubauer et al. ........... | 382/152 |

\* cited by examiner

*Primary Examiner*—Gims Philippe
(74) *Attorney, Agent, or Firm*—J.C. Patents

(57) ABSTRACT

The invention provides a method for a motion estimation algorithm. The motion estimation algorithm using low bit resolution integrated edge image instead of luminance image to obtain difference block with small AC coefficients, edge image created by filters is employed to improve encoding quality, on the other hand, operation cost is reduced to low bit resolution. The invention also provides a method for a motion estimation algorithm with a new algorithm using low-bit resolution oriented edge image. Using low-bit resolution oriented edge in motion estimation can result in flatter image blocks which is in demanded by texture-compress unit (such as DCT), as a result, the encoding efficiency is improved, and the operation load is reduced by low-bit resolution.

10 Claims, 3 Drawing Sheets

METHOD FOR MOTION ESTIMATION USING A LOW-BIT EDGE IMAGE

BACKGROUND OF THE INVENTION

1. Field of Invention

The present invention relates to a method for a motion estimation algorithm. More particularly, the present invention relates to a method for a motion estimation algorithm based on block matching. The invention uses a low bit resolution oriented edge image, by which appropriate difference blocks for DCT coding are generated and encoding efficiency is enhanced.

2. Description of Related Art

Block-based motion estimation (ME) have been adopted to eliminate temporal redundancy of image sequence by MPEP1/2 and H.261, matched difference block for DCT coding is obtained under certain matching criterion. Due to high operation load of full search (FS), ME has been the main bottleneck in real time image encoding system, many fast ME algorithms have been developed to reduce the computation cost.

In most ME algorithms, sum of absolute difference (SAD) of luminance pixel is used as searching criterion, and results in the best matched difference block with global or local minimum energy, i.e., minimum direct current (DC) coefficients after DCT, but the alternating current (AC) coefficients might be large and encoding efficiency is reduced.

SUMMARY OF THE INVENTION

The invention provides a method for a motion estimation algorithm. The motion estimation algorithm using low bit resolution integrated edge image (LRIEI) instead of luminance image to obtain difference block with small AC coefficients, edge image created by Sobel filters is employed to improve encoding quality, on the other hand, operation cost is reduced to low bit resolution.

The invention also provides a method for a motion estimation algorithm, in which a new algorithm using low-bit resolution oriented edge image (LROEI) is described in this invention. Using low-bit resolution oriented edge in motion estimation can result in flatter image blocks which is in demanded by texture-compress unit (such as DCT), as a result, the encoding efficiency is improved, and the operation load is reduced by low-bit resolution.

As embodied and broadly described herein, the invention provides a method for motion estimation. In the method, an oriented edge image is generaged by an edge-detect-filtering process in according with contour and texture of an original luminance image. An subsampled edge image is generated by performing an low-bit resolution oriented edge image process upon the edge image. A wide-range search is performed upon the subsampled edge image to generate a motion vector. A small-range full search is performed upon the generated motion vector to obtain a final motion vector by using decoded luminance pixels.

In the above-mentioned method for motion estimation, the edge-detect-filtering process including performing a x-direction filtering process and a y-direction filtering process to generate a x-direction oriented edge pixels and a y-direction oriented edge pixels; and generating the oriented edge image by adding the x-direction edge pixels and the y-direction edge pixels.

In the above-mentioned method for motion estimation, the x-direction edge pixels and the y-direction edge pixels are generated in accordance with following equations, respectively:

$$x = \sum_{k=0}^{N-1} \sum_{l=0}^{N-1} |Cgx(x+k, y+l) - Rgx(x+i+k, y+j+l)|$$

$$y = \sum_{k=0}^{N-1} \sum_{l=0}^{N-1} |Cgy(x+k, y+l) - Rgy(x+i+k, y+j+l)|$$

where Cgx/Cgy and Rgx/Rgy are Gx/Gy edge intensity of a current block and a reference block respectively;

$$SADgxy(i, j) = SADgx + SADgy = x + y$$

SADgxy is the sum of absolute difference of the original luminance image and is used for a search criterion.

In the above-mentioned method for motion estimation, the low-bit resolution oriented edge image process including performing a non-uniform quantization process upon the edge image. The non-uniform quantization process including providing a plurality of quantization levels in accordance with a predetermined bit-length; and quantizing the x-direction edge pixels and the y-direction edge pixels in accordance with the quantization levels to generate the subsampled edge image. The bit-length is depended upon encoding quality, the more the bit-length, the better the encoding quality. The bit-length can be 8-bit, 6-bit, or 4-bit, for example.

As embodied and broadly described herein, the invention provides a method for motion estimation. In the method for motion estimation, an oriented edge image is generated by an edge-detect-filtering process in according with contour and texture of an original luminance image. The edge-detect-filtering process including performing a x-direction filtering process and a y-direction filtering process to generate a x-direction oriented edge pixels and a y-direction oriented edge pixels; and generating the oriented edge image by adding the x-direction edge pixels and the y-direction edge pixels. In the method, an subsampled edge image is generated by performing an low-bit resolution oriented edge image process upon the edge image. The low-bit resolution oriented edge image process including performing a non-uniform quantization process upon the edge image. The non-uniform quantization process including providing a plurality of quantization levels in accordance with a predetermined bit-length, wherein the bit-length is depended upon encoding quality, the more the bit-length, the better the encoding quality; and quantizing the x-direction edge pixels and the y-direction edge pixels in accordance with the quantization levels to generate the subsampled edge image. In the method further includes using the subsampled edge image to generate a motion vector for the original luminance image.

In the above-mentioned method for motion estimation, the x-direction edge pixels and the y-direction edge pixels are generated in accordance with following equations, respectively:

$$x = \sum_{k=0}^{N-1} \sum_{l=0}^{N-1} |Cgx(x+k, y+l) - Rgx(x+i+k, y+j+l)|$$

-continued $$y = \sum_{k=0}^{N-1} \sum_{l=0}^{N-1} |Cgy(x+k, y+l) - Rgy(x+i+k, y+j+l)|$$

where Cgx/Cgy and Rgx/Rgy are Gx/Gy edge intensity of a current block and a reference block respectively;

$$SADgxy(i, j) = SADgx + SADgy = x + y$$

SADgxy is the sum of absolute difference of the original luminance image and is used for a search criterion.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 showing an average percentage statistical distribution of the an edge-detect-filtering process in according with contour and texture of an original luminance image of a preferred embodiment of the invention.

DESCRIPTION OF THE PREFERRED EMBODIMENTS

Figure 1:
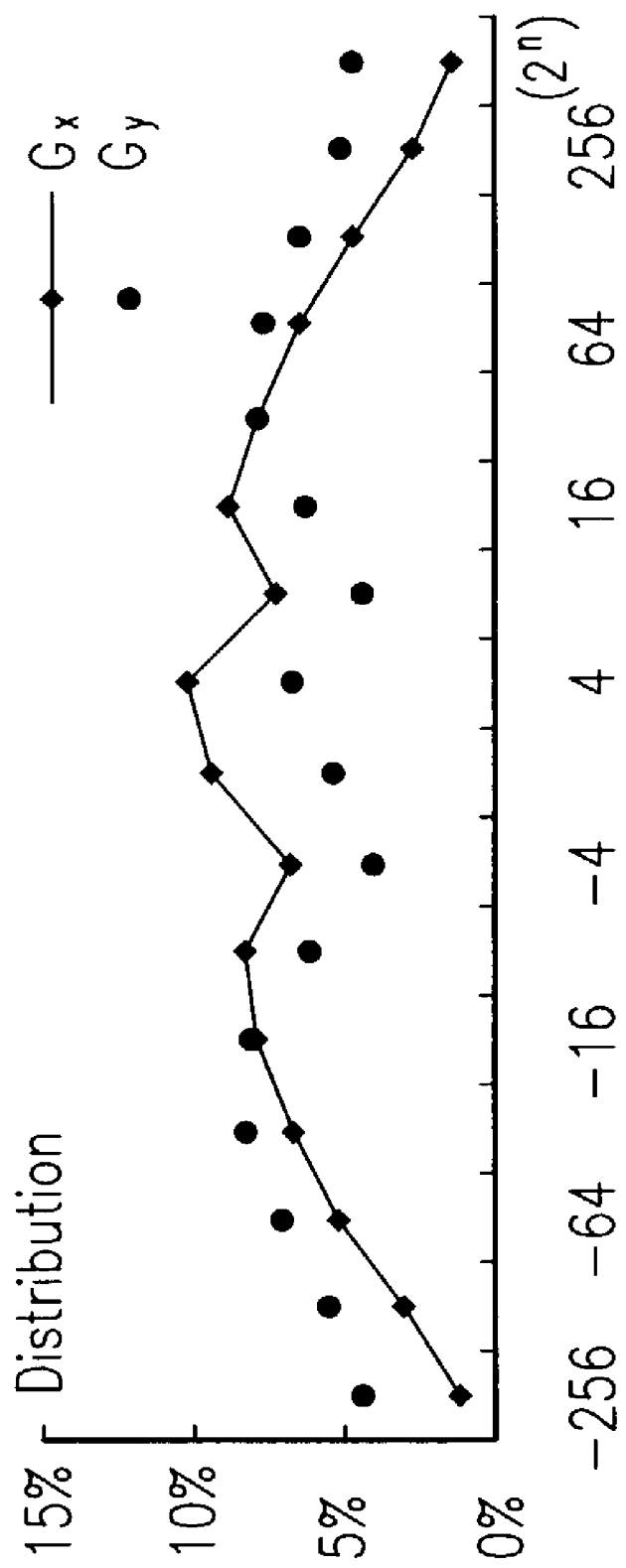
Figure 2B:
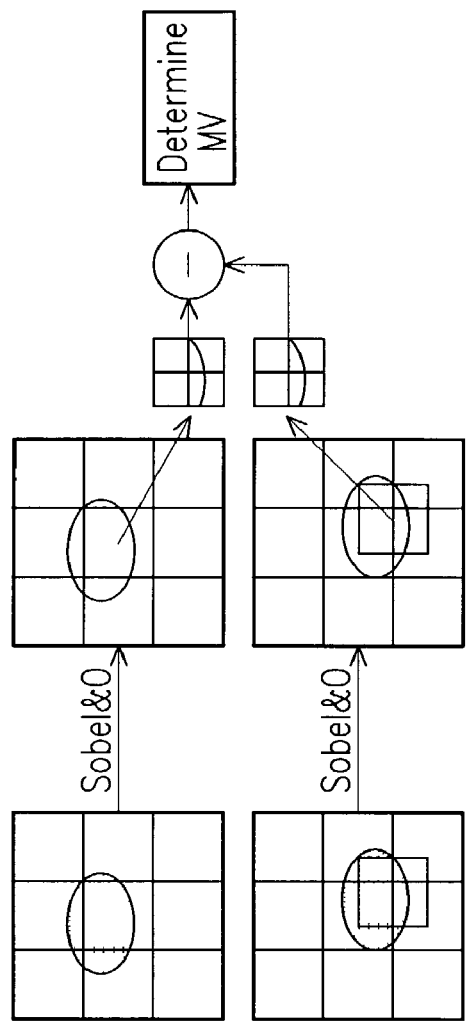
FIG. 2B is a diagram of a preferred embodiment of a method for an algorithm using low bit resolution oriented edge image in the invention.
Figure 2A:
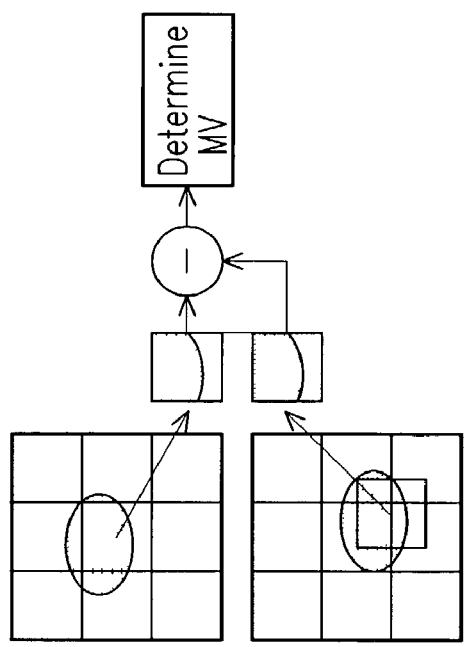
FIG. 2A is a diagram of a conventional method for a motion estimation algorithm.

The invention provides a method for a motion estimation algorithm. The motion estimation algorithm using low bit resolution integrated edge image (LRIEI) instead of luminance image to obtain difference block with small AC coefficients, edge image created by Sobel filters is employed to improve encoding quality, on the other hand, operation cost is reduced to low bit resolution.

The invention also provides a method for a motion estimation algorithm, in which a new algorithm using low bit resolution oriented edge image (LROEI) is described in this paper. Compared with LRIEI, LROEI is more accurate to denote the feature of objects in image. As a result, encoding quality is improved further. As LRIEI, low bit resolution guarantees low hardware cost. The algorithm is regular for very large scaled integrated circuit (VLSI) realization and easily combined with other ME algorithm such as a hierarchical subsampling telescopic search. Mismach between DCT and conventional ME DCT, the texture-compression unit of H.261 and MPEG 1/2, transforms 8×8 pixel block to corresponding frequency domain and packs energy in low-frequency coefficients (LFC). Flatter the block (fewer edge points in the block), that is more energy concentrates in LFC, results in fewer bit amount of quantified AC coefficients, so that encoding efficiency is improved.

However, the conventional ME algorithm using sum of absolute difference (SAD) of luminance pixel only guarantee minimum DC coefficient, but not the flattest one. As shown in Table 1 as followed:

TABLE 1

| 3 | 0 | 9 | 3 | 6 | 3 | 21 | 20 | 23 | 21 | 22 | 21 |
|---|---|---|---|---|---|----|----|----|----|----|----|
| 6 | 6 | 0 | 0 | 18 | 27 | 22 | 22 | 20 | 20 | 26 | 29 |
| 6 | 9 | 3 | 3 | 0 | 3 | 22 | 23 | 21 | 21 | 20 | 21 |
| 6 | 0 | 0 | 0 | 0 | 0 | 22 | 20 | 20 | 20 | 20 | 20 |
| 3 | 6 | 0 | 3 | 0 | 0 | 21 | 22 | 20 | 21 | 20 | 20 |
| 3 | 0 | 0 | 3 | 0 | 0 | 21 | 20 | 20 | 21 | 21 | 20 |

Image M      Image N

Table 1 shows two 6*6 luminance difference image M & N, and two 4*4 extracted centro-blocks $M_0$ & $N_0$ as sample:

$$M_0(1:4, 1:4) = M(2:5, 2:5)$$

$$N_0(1:4, 1:4) = N(2:5, 2:5)$$

The sums of $M_0$ & $N_0$ are 48 and 336 respectively. Apparently, conventional ME algorithms select block $M_0$ as the best match, but the DCT/Q results in Table 2 shows that block $N_0$ requires less encoding bit amount and should be selected as the best match.

TABLE 2

DCT/Q Results of $M_0$ & $N_0$

| 5 | 0 | 3 | 0 | 41 | 0 | 1 | 0 |
|---|---|---|---|----|---|---|---|
| 5 | -2 | 3 | -1 | 1 | 0 | 1 | 0 |
| 2 | -2 | 3 | 0 | 0 | 0 | 1 | 0 |
| 1 | -3 | 0 | -1 | 0 | -1 | 0 | 0 |

Block $M_0$      Block $N_0$

Edge Image and Sobel Filter

Edge image, which is employed for ME to search flatter block, includes both contour and texture of objects and denotes high frequency component of the image. Sobel edge-detect-filters are engaged to create edge image due to smoothness and low noise. Sobel filters are composed of both x-direction and y-direction filters Sx and Sy respectively.

$$S_y = \begin{bmatrix} 1 \\ 0 \\ -1 \end{bmatrix} \times \begin{bmatrix} 1 \\ 2 \\ 1 \end{bmatrix} = \begin{bmatrix} -1 & -2 & -1 \\ 0 & 0 & 0 \\ 1 & 2 & 1 \end{bmatrix} \quad (1)$$

$$S_x = \begin{bmatrix} 1 \\ 0 \\ -1 \end{bmatrix} \times \begin{bmatrix} 1 \\ 2 \\ 1 \end{bmatrix} = \begin{bmatrix} -1 & 0 & 1 \\ -2 & 0 & 2 \\ -1 & 0 & 1 \end{bmatrix} \quad (2)$$

$$Gy = Filter2(Sy, L) \quad (3)$$

$$Gx = Filter2(Sx, L) \quad (4)$$

where Filter2 is 2D digital filter, L is 8-bit luminance image. Gx and Gy are 11 bit x-direction and y-direction edge intensity respectively. For LRIEI, Sobel edge intensity is integration of Gx and Gy:

$$G = |Gx| + |Gy| \quad (5)$$

Gx and Gy are used respectively (oriented edge intensity) to describe the edge feature in detail. For example, according to equation (5), (Gx, Gy)=(1,3) or (−3,1) will result in same integrated edge intensity G. Obviously, using oriented edge intensity Gx and Gy respectively are more accurate for ME. To extract the oriented edge intensity of one pixel, 8 adjacent pixels and 8 addition operations are needed.

Due to oriented edge intensity is employed, the function of ME should be $$x = \sum_{k=0}^{N-1} \sum_{l=0}^{N-1} |Cgx(x+k, y+l) - Rgx(x+i+k, y+j+l)|$$

$$y = \sum_{k=0}^{N-1} \sum_{l=0}^{N-1} |Cgy(x+k, y+l) - Rgy(x+i+k, y+j+l)|$$

$$SADgx = \sum_{k=0}^{N-1} \sum_{l=0}^{N-1} |Cgx - Rgx(i, j)|$$

$$SADgy = \sum_{k=0}^{N-1} \sum_{l=0}^{N-1} |Cgy - Rgy(i, j)|$$

$$SADgxy(i, j) = SADgx + SADgy$$

Where Cgx/Cgy and Rgx/Rgy are Gx/Gy edge intensity of current and reference block respectively, SADgxy is the SAD of them and used as searching criterion. For above example, the SADgxy of block $M_0$, $N_0$ are 436 and 146, therefore, the flatter block $N_0$ is selected.

LROEI & Non-Uniform Quantization

LROEI is generated by non-uniform quantization (NUQ) to reduce operation load at the minimal quality degradation. The average percentage statistical distribution (shown in Table 3 and FIG. 1) of the Sobel processed oriented edge intensity is done first for five benchmarked video sequences (flower), FTBL (football) and MBCL (mobile & Calendar). Each one is composed with 60 fields.

The data in Table 3 and FIG. 1 show the average percentage distribution of pixels. For example, 1.4% x-direction edge pixels (Gx) are less than $-2^8(-256)$, and 3.2% Gx are between $-2^8$ and $-2^7$.

TABLE 3

The average distribution (%) of edge intensity

| Val | $-2^8$ | $-2^7$ | $-2^6$ | $-2^5$ | $-2^4$ | $-2^3$ | $-2^2$ | $-2^0$ | $2^2$ | $2^3$ | $2^4$ | $2^5$ | $2^6$ | $2^7$ | $2^8$ | $2^{10}$ |
|---|---|---|---|---|---|---|---|---|---|---|---|---|---|---|---|---|
| Gx | 1.4 | 3.2 | 5.2 | 6.9 | 7.9 | 8.4 | 6.9 | 9.6 | 10 | 7.4 | 8.9 | 7.9 | 6.6 | 4.9 | 3 | 1.5 |
| Gy | 4.6 | 5.7 | 7.2 | 8.3 | 8.1 | 6.2 | 4.1 | 5.5 | 6.8 | 4.6 | 6.5 | 7.9 | 7.9 | 6.5 | 5.3 | 4.8 |

In the proposed algorithm, the mail goal of quantization is to make the quantized pixels distribute as uniformly as possible in all levels. Obviously, NUQ performs better than uniform quantization because edge pixels distribute non-uniform. Unlike luminance pixels, most edge pixels distribute in low bits. If 7 bit least significant bits of Gx are truncated directly to achieve 4-bit resolution quantization, 48% pixels (that between 0 and $2^7$) will be quantized to 0000, and the only 3% pixels distribute in other 14 levels.

FIG. 1 shows if logarithm axis used for Gx/Gy, the edge pixels distribute evenly. In order to study how the bit-length influence encoding quality, different bit-length NUQ shemes are designed based on the logarithm distribution. 8-Bit NUQ More quantization levels are, more information are kept, to guarantee encoding quality, 8-bit NUQ scheme is designed (4-bit for Gx and 4-bit for Gy) as in Table 4:

Table 4

| GGx/GGy Levels | Corresponding Gx/Gy |
|---|---|
| 0 | $-2^{10}$ to $-2^8$ |
| 1 | $-2^8$ to $-2^7$ |
| 2 | $-2^7$ to $-2^6$ |
| 3 | $-2^6$ to $-2^5$ |
| 4 | $-2^5$ to $-2^4$ |
| 5 | $-2^4$ to $-2^3$ |
| 6 | $-2^3$ to $-2^2$ |
| 7 | $-2^2$ to 0 |
| 8 | 0 to $2^2$ |
| 9 | $2^2$ to $2^3$ |
| 10 | $2^3$ to $2^4$ |
| 11 | $2^4$ to $2^5$ |
| 12 | $2^5$ to $2^6$ |
| 13 | $2^6$ to $2^7$ |
| 14 | $2^7$ to $2^8$ |
| 15 | $2^8$ to $2^{10}$ |

Where Gx/Gy are 11-bit-signed oriented edge pixel, and GGx/Ggy are quantized 4-bit oriented edge pixels. The quantization schemes for Gx and Gy are same.

6-Bit NUQ

To reduce the computation load, more redundance of edge pixel are Q scheme is designed (3 bit for Gx and 3 bit for Gy) as in Table 5:

TABLE 5

| Ggx/Ggy Level | Corresponding Gx | Corresponding Gy |
|---|---|---|
| 0 | $-2^{10}$ to $-2^6$ | $-2^{10}$ to $2^7$ |
| 1 | $-2^6$ to $-2^4$ | $-2^7$ to $-2^5$ |
| 2 | $-2^4$ to $-2^2$ | $-2^5$ to $-2^3$ |
| 3 | $-2^2$ to 0 | $-2^3$ to 0 |
| 4 | 0 to $2^2$ | 0 to $2^3$ |
| 5 | $2^2$ to $2^4$ | $2^3$ to $2^5$ |
| 6 | $2^4$ to $2^6$ | $2^5$ to $2^7$ |
| 7 | $2^6$ to $2^{10}$ | $2^7$ to $2^{10}$ |

The quantization schemes for Gx and Gy in Gxy6 are different due to the different distribution of Gx and Gy shown in Table 5.

4-Bit NUQ

Based on Gxy6, a more contracted 4-bit NUQ scheme is designed (2 bits for Gx and 2 bits for Gy) as in Table 6:

TABLE 6

| GGx/GGy Level | Corresponding Gx | Corresponding Gy |
|---|---|---|
| 0 | $-2^{10}$ to $-2^4$ | $-2^{10}$ to $-2^5$ |
| 1 | $-2^4$ to 0 | $-2^5$ to 0 |

TABLE 6-continued

| GGx/GGy Level | Corresponding Gx | Corresponding Gy |
|---|---|---|
| 2 | 0 to $2^4$ | 0 to $2^5$ |
| 3 | $2^4$ to $2^{10}$ | $2^5$ to $2^{10}$ |

The quantization schemes for Gx and Gy are also different.

Combined ME Algorithm

Figure 3:
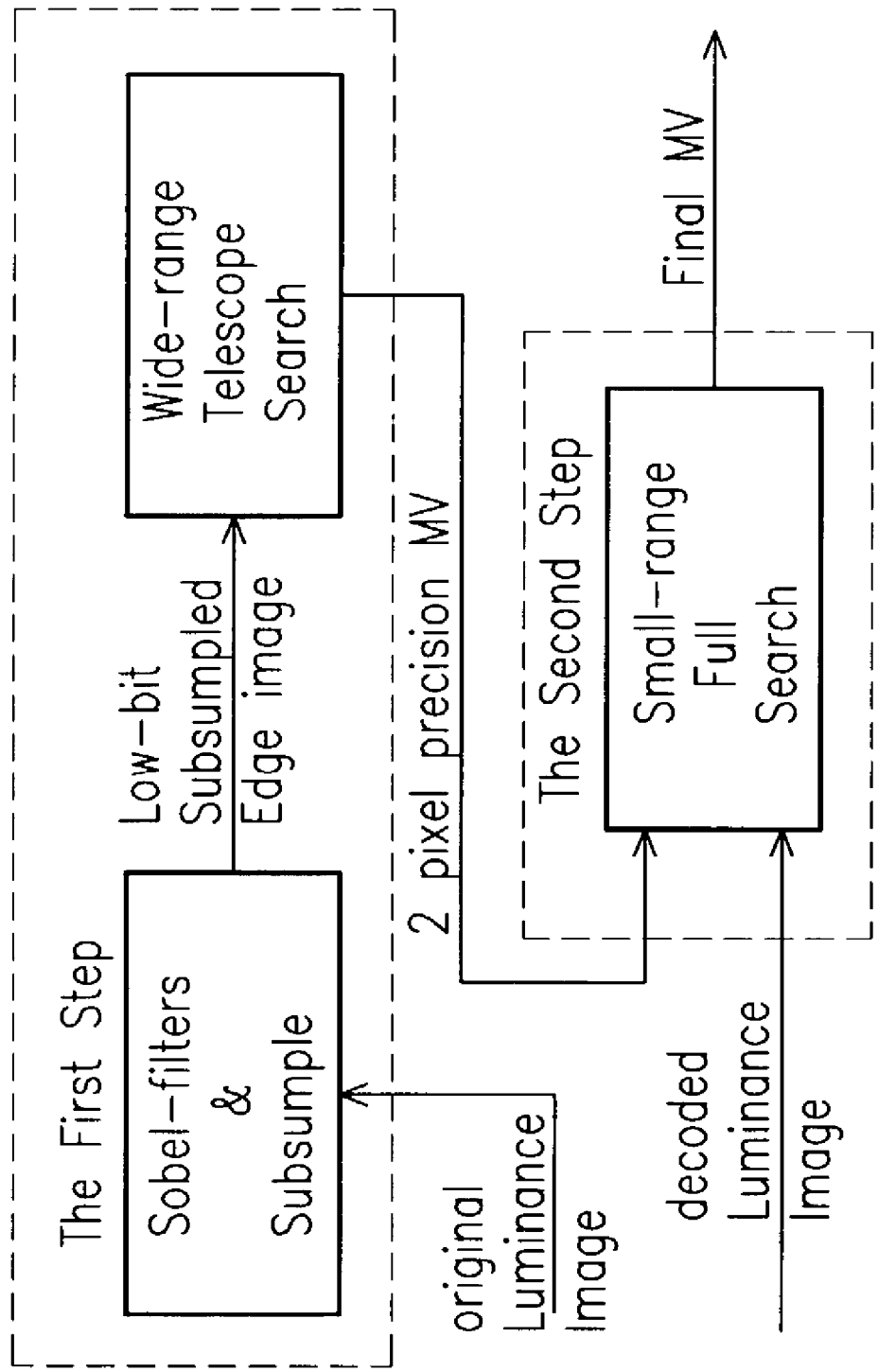
FIG. 3 is a diagram of a preferred embodiment of a hierarchical subsampling telescopic search using the motion estimation algorithm of the invention.

Hierarchical subsampling telescopic search (HSTS), as shown in FIG. 3, is combined to achieve large range search with low operation load. The HSTS composes two steps:
(1). Wide-range search is processed in the first step, sub-sampling telescope algorithm using LROEI is employed to find a coarse motion vector (MV). 4:1 subsampling reduces both block size and search area, telescope search based on temporal correlation of motion is adopted to reduce operation load further.
(2). To refine the results, in the second step, small range FS is processed over centering on the MV obtained from the first step, decoded luminance pixels are used.

Simulation and Comparison

Five sets of CCIR601 video sequences are used for simulation, each set is composed of 28 frames/56 fields (720*480 pixels/frame, 30 frames/sec.). Only luminance component is considered. Field prediction is adopted, M=2. The maximal possible search range of HSTS is 210 pixels in horizontal direction and 56 pixels in vertical direction. Constant quantization matrixes are used to generate bitstream.

Combined with HSTS, five scheme using different images are studied:
L8: 8 bit luminance image.
UQL4: 4-bit uniform quantized luminance image (truncating 4 bit LSB of L8)
Gxy8: 8-bit LROEI
Gxy6: 6-bit LROEI
Gxy4: 4-bit LROEI
The PSNR simulation results of five schemes are listed in Table 7.

TABLE 7

PSNR Comparison of Various Algorithm Scheme

| | L8 | UQL4 | Gxy8 | Gxy6 | Gxy4 |
|---|---|---|---|---|---|
| BUS | 30.158 | 30.082 | 30.239 | 30.243 | 30.228 |
| Cher | 29.065 | 29.058 | 29.122 | 29.118 | 29.114 |
| Flower | 29.256 | 29.234 | 29.289 | 29.289 | 29.285 |
| Ftbl | 35.0222 | 34.933 | 35.005 | 35.009 | 35.001 |
| Mbcl | 27.411 | 27.401 | 27.454 | 27.451 | 27.445 |
| Avg. | 30.183 | 30.142 | 30.222 | 30.222 | 30.125 |

Compared with L8, the performance of LROEI algorithm is improved, and the PSNR is not sensitive to bit-length of the oriented edge pixels, the results of Gxy8, Gxy6 and Gxy4 are nearly same. Taking notice of that thee PSNR of UQL4 is the lowest one among Table 7. The results show that oriented edge image are superior to luminance image, even 4-bit oriented edge image can achieve better encoding quality.

A new ME algorithm using LROEI is proposed in the invention. Simulation results show that LROEI are appropriate to search MV and difference block for DCT-based video compressing system. Combined with HSTS, Gxy8/6/4 can improve encoding efficiency. The hardware cost, bandwidth and power consumption of motion estimation are reduced due to low-bit resolution. It is very easy to be combined with other fast ME algorithm. Therefore, this algorithm is useful for real-time wide range search video encoding applications such as HDTV. The hardware can be modified through reducing the bit number directly and changing the computation components slightly, only Sobel filter and NUQ are required.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for motion estimation, comprising:
generating an oriented edge image by an edge-detect-filtering process in according with contour and texture of an original luminance image;
generating a subsampled edge image by performing a low-bit resolution oriented edge image process upon the edge image;
performing a wide-range search upon the subsampled edge image to generate a motion vector;
performing a small-range full search upon the generated motion vector to obtain a final motion vector by using decoded luminance pixels.

2. The method for motion estimation of claim 1, wherein the edge-detect-filtering process comprising:
performing a x-direction filtering process and a y-direction filtering process to generate a x-direction oriented edge pixels and a y-direction oriented edge pixels; and
generating the oriented edge image by adding the x-direction edge pixels and the y-direction edge pixels.

3. The method for motion estimation of claim 1, wherein the x-direction edge pixels and the y-direction edge pixels are generated in accordance with the following equations, respectively:

$$x = \sum_{k=0}^{N-1} \sum_{l=0}^{N-1} |Cgx(x+k, y+1) - Rgx(x+i+k, y+j+l)|$$

$$y = \sum_{k=0}^{N-1} \sum_{l=0}^{N-1} |Cgy(x+k, y+1) - Rgy(x+i+k, y+j+l)|$$

where Cgx/Cgy and Rgx/Rgy are Gx/Gy edge intensity of a current block and a reference block, respectively;

$$SADgxy(i, j)+SADgx=SADgy=x+y$$

SADgxy is the sum of absolute difference of the original luminance image and is used for a search criterion.

4. The method for motion estimation of claim 3, wherein the low-bit resolution oriented edge image process including performing a non-uniform quantization process upon the edge image, and the non-uniform quantization process including:
providing a plurality of quantization levels in accordance with a predetennined bit-length; and
quantizing the x-direction edge pixels and the y-direction edge pixels in accordance with the quantization levels to generate the subsampled edge image.

5. The method for motion estimation of claim 3, wherein the bit-length is 8-bit.

6. The method for motion estimation of claim 3, wherein the bit-length is 6-bit.

7. The method for motion estimation of claim 3, wherein the bit-length is 4-bit.

8. The method for motion estimation of claim 3, wherein the bit-length is depended upon encoding quality, wherein the more the bit-length, the better the encoding quality.

9. A method for motion estimation, comprising:
generating an oriented edge image by an edge-detect-filtering process in according with contour and texture of an original luminance image, the edge-detect-filtering process including:
performing AN x-direction filtering process and a y-direction filtering process to generate AN x-direction oriented edge pixels and a y-direction oriented edge pixels; and
generating the oriented edge image by adding the x-direction edge pixels and the y-direction edge pixels;
generating A subsampled edge image by performing A low-bit resolution oriented edge image process upon the edge image, the low-bit resolution oriented edge image process including performing a non-uniform quantization process upon the edge image, and the non-uniform quantization process including:
providing a plurality of quantization levels in accordance with a predetermined bit-length, wherein the bit-length is depended upon encoding quality, the more the bit-length, the better the encoding quality.; and
quantizing the x-direetion edge pixels and the y-direction edge pixels in accordance with the quantization levels to generate the subsampled edge image; and
using the subsampled edge image to generate a motion vector for the original luminance image.

10. The method for motion estimation of claim 9, wherein the x-direction edge pixels and the y-direction edge pixels are generated in accordance with the following equations, respectively:

$$x = \sum_{k=0}^{N-1} \sum_{l=0}^{N-1} |Cgx(x+k, y+1) - Rgx(x+i+k, y+j+l)|$$

$$y = \sum_{k=0}^{N-1} \sum_{l=0}^{N-1} |Cgy(x+k, y+1) - Rgy(x+i+k, y+j+l)|$$

where Cgx/Cgy and Rgx/Rgy are Gx/Gy edge intensity of a current block and a reference block, respectively;

$SADgxy(i, j) = SADgx + SADgy = x+y$

SADgxy is the sum of absolute difference of the original luminance image and is used for a search criterion.

* * * * *